US012158709B2

(12) United States Patent
Furuta

(10) Patent No.: US 12,158,709 B2
(45) Date of Patent: Dec. 3, 2024

(54) IMAGE FORMING APPARATUS INCLUDING EXPOSURE HEAD PROVIDED WITH PLURALITY OF LIGHT EMITTING CHIPS

(71) Applicant: CANON KABUSHIKI KAISHA, Tokyo (JP)

(72) Inventor: Yasutomo Furuta, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/119,999

(22) Filed: Mar. 10, 2023

(65) Prior Publication Data

US 2023/0305426 A1 Sep. 28, 2023

(30) Foreign Application Priority Data

Mar. 24, 2022 (JP) ................................ 2022-048421

(51) Int. Cl.
*G03G 15/04* (2006.01)
*G03G 15/043* (2006.01)

(52) U.S. Cl.
CPC ..... *G03G 15/043* (2013.01); *G03G 15/04027* (2013.01); *G03G 15/04036* (2013.01); *G03G 15/04045* (2013.01); *G03G 15/04054* (2013.01)

(58) Field of Classification Search
CPC ....... G03G 15/04027; G03G 15/04036; G03G 15/04045; G03G 15/04054; G03G 15/043; G03G 2215/0407; G03G 2215/0412; G03G 2215/0426; G03G 2215/0429
See application file for complete search history.

(56) References Cited

U.S. PATENT DOCUMENTS 11,036,158 B1 * 6/2021 Tanimoto ......... G03G 15/04054
11,409,208 B2 * 8/2022 Yoshida ............... G03G 15/043
2018/0091697 A1 * 3/2018 Fujita .................. G03G 15/043

FOREIGN PATENT DOCUMENTS

JP 2018-001679 A 1/2018

OTHER PUBLICATIONS

U.S. Appl. No. 18/120,084, Yasutomo Furuta, filed Mar. 10, 2023.

* cited by examiner

*Primary Examiner* — Sophia S Chen
(74) *Attorney, Agent, or Firm* — Venable LLP

(57) ABSTRACT

An image forming apparatus includes at least one processor that is configured to generate second image data corresponding to each of a plurality of light emitting elements based on first image data, the second image data indicating whether to cause each of the plurality of light emitting elements to emit light, and based on correction information, change the first image data indicating that the light emitting elements are to emit light to the second image data indicating that the light emitting elements are not to emit light. A circuit unit is configured to supply a current to each of the plurality of light emitting elements based on the second image data.

14 Claims, 15 Drawing Sheets

IMAGE FORMING APPARATUS INCLUDING EXPOSURE HEAD PROVIDED WITH PLURALITY OF LIGHT EMITTING CHIPS

BACKGROUND OF THE INVENTION

Field of the Invention

The present invention relates to an image forming apparatus of an electrophotographic method.

Description of the Related Art

An image forming apparatus of an electrophotographic method forms an electrostatic latent image on a photosensitive member, which is driven to rotate, by exposing the photosensitive member to light, and forms an image by developing this electrostatic latent image using toner. Note that the direction parallel to a rotation axis of the photosensitive member is referenced as a main scanning direction. Japanese Patent Laid-Open No. 2018-1679 discloses an image forming apparatus in which a plurality of chips including a plurality of light emitting elements are arrayed in the main scanning direction, and which exposes one line in the main scanning direction to light. Japanese Patent Laid-Open No. 2018-1679 discloses a configuration that corrects density unevenness caused by a difference between light amounts of two chips that neighbor each other in the main scanning direction.

However, the difference between light amounts can arise not only between chips, but also among a plurality of light emitting elements inside a chip. Therefore, correcting only the difference between light amounts of chips can still leave the possibility that density unevenness appears in a formed image. That is to say, density unevenness appears in an image formed by the configuration of Japanese Patent Laid-Open No. 2018-1679.

SUMMARY OF THE INVENTION

According to an aspect of the present invention, an image forming apparatus, includes: a photosensitive member that is driven to rotate; an exposure head including a plurality of light emitting chips that are placed at different positions in a direction along a rotation axis of the photosensitive member, each of the plurality of light emitting chips including a plurality of light emitting elements that are placed at different positions in the direction along the rotation axis of the photosensitive member, a digital-analog converter that outputs a voltage corresponding to a setting value as a digital value, and a circuit unit that supplies a current to the plurality of light emitting elements based on the voltage output from the digital-analog converter; and at least one processor, w % herein the at least one processor is configured to generate second image data corresponding to each of the plurality of light emitting elements based on first image data, the second image data indicating whether to cause each of the plurality of light emitting elements to emit light, and based on correction information, change the first image data indicating that the light emitting elements are to emit light, to the second image data indicating that the light emitting elements are not to emit light, and the circuit unit supplies a current to each of the plurality of light emitting elements based on the second image data.

Further features of the present invention will become apparent from the following description of exemplary embodiments with reference to the attached drawings.

DESCRIPTION OF THE EMBODIMENTS

Figure 1:
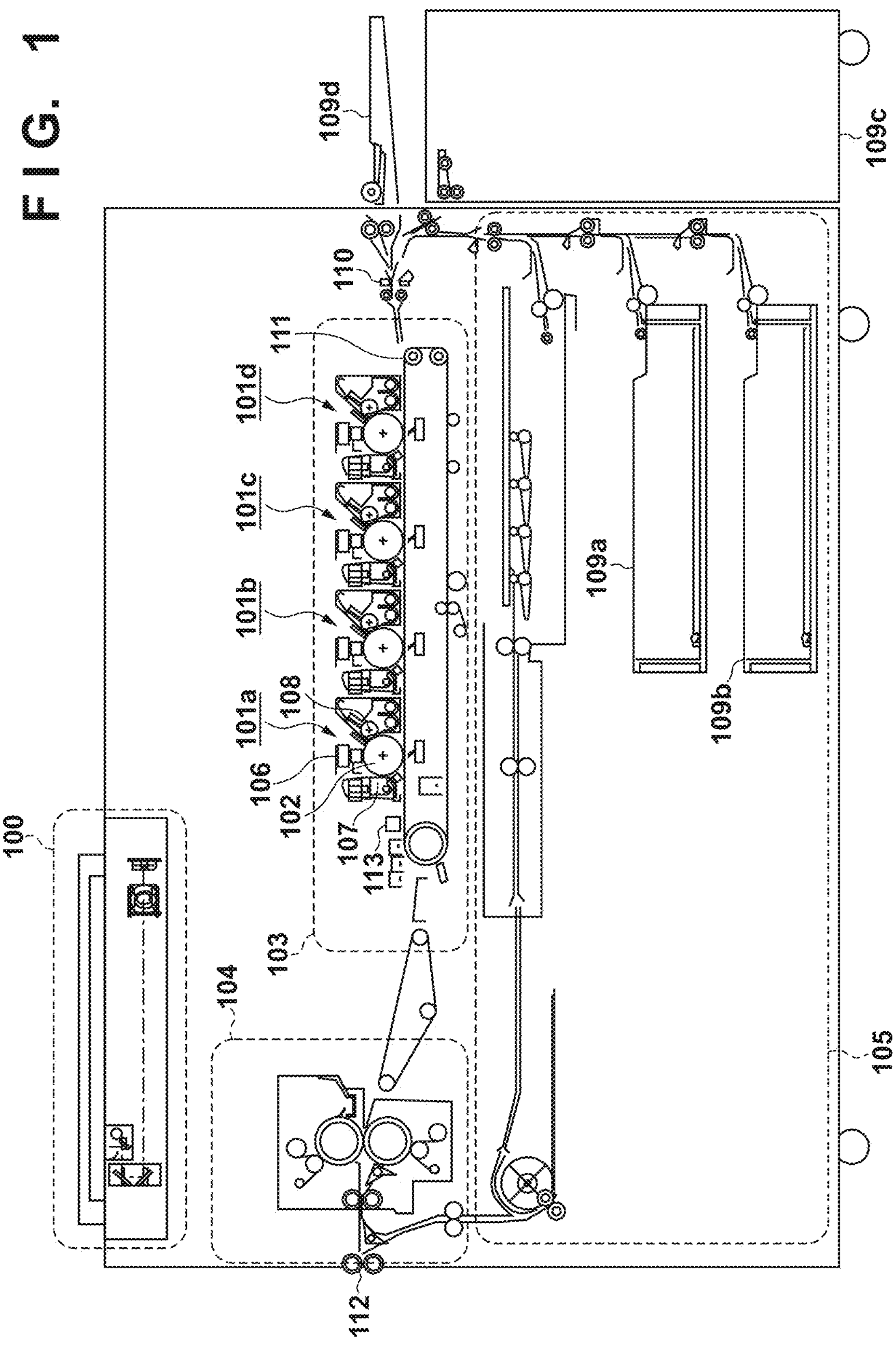
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a schematic configuration diagram of an image forming apparatus according to the present embodiment. A reading unit 100 optically reads an original placed on a platen, and generates image data indicating the result of reading. An image creation unit 103 forms an image on a sheet, for example, based on the image data generated by the reading unit 100, or based on image data received from an external apparatus via a network.

The image creation unit 103 includes image forming units 101*a*, 101*b*, 101*c*, and 101*d*. The image forming units 101*a*, 101*b*, 101*c*, and 101*d* form black, yellow, magenta, and cyan toner images, respectively. The configurations of the image forming units 101*a*. 101*b*, 101*c*, and 101*d* are similar to one another; hereinafter, they are also collectively referred to as image forming units 101. At the time of image formation, a photosensitive member 102 of an image forming unit 101 is rotated in a clockwise direction of the figure. A charger 107 charges the photosensitive member 102. An exposure head 106 exposes the photosensitive member 102 to light in accordance with image data, and forms an electrostatic latent image on the photosensitive member 102. A developer 108 develops the electrostatic latent image on the photosensitive member 102 using toner. The toner image on the photosensitive member 102 is transferred to a sheet conveyed on a transfer belt 111. Note that colors different from black, yellow, magenta, and cyan can be reproduced by transferring the toner images on the respective photosensitive members 102 in such a manner that the toner images overlap one another.

A conveyance unit 105 controls feeding and conveyance of sheets. Specifically, the conveyance unit 105 feeds a sheet to a conveyance path in the image forming apparatus from a designated unit among internal storage units 109*a* and 109*b*, an external storage unit 109*c*, and a manual feed unit 109*d*. The sheet that has been fed is conveyed to a registration roller 110. The registration roller 110 conveys the sheet onto the transfer belt 111 at a predetermined timing so that the toner images on the respective photosensitive members 102 are transferred to the sheet. As stated earlier, the toner images are transferred to the sheet while the sheet is conveyed on the transfer belt 111. A fixing unit 104 applies heat and pressure to the sheet to which the toner images have been transferred, thereby fixing the toner images on the sheet. After the toner images have been fixed, the sheet is discharged to the outside of the image forming apparatus by a discharge roller 112. Note that an optical sensor 113 is placed in a position facing the transfer belt 1. The optical sensor 113 detects a test chart for measuring an amount of color misregistration, which is formed on the transfer belt 111 by the image forming unit 101. A control unit, not shown in the figure, performs color misregistration correction control based on the detection result of the test chart.

Figure 2B:
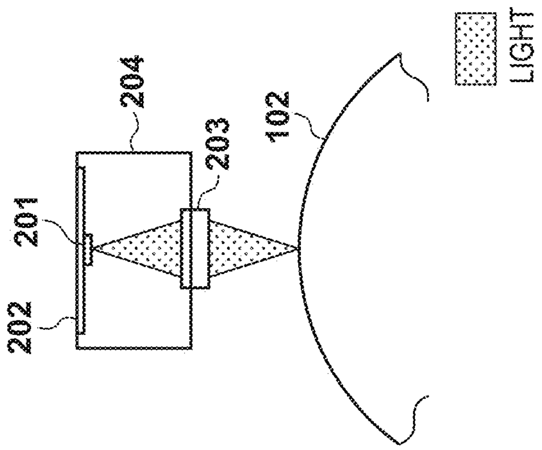
FIG. 2A and FIG. 2B are diagrams showing an exposure head and a photosensitive member according to an embodiment.
Figure 2A:
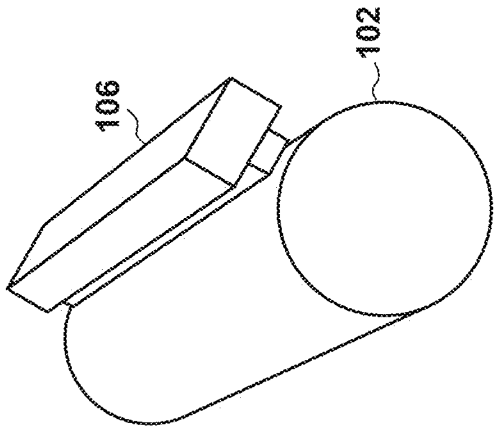

FIG. 2A and FIG. 2B show the photosensitive member 102 and the exposure head 106. The exposure head 106 includes a group of light emitting elements 201, a printed circuit board 202 on which the group of light emitting elements 201 is mounted, a cylindrical lens array 203, and a housing 204 for attaching the cylindrical lens array 203 to the printed circuit board 202. The cylindrical lens array 203 forms a formed-image spot (hereinafter simply referred to as a spot) of a predetermined size on the photosensitive member 102 by collecting light emitted by the group of light emitting elements 201 on the photosensitive member 102.

Figure 3A:
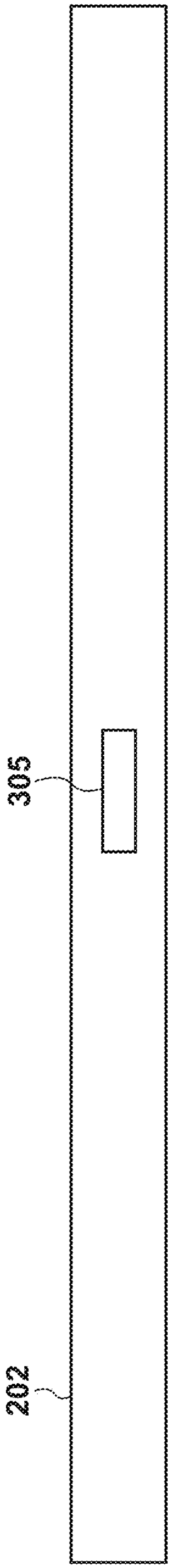
FIG. 3A and FIG. 3B are diagrams showing a printed circuit board of the exposure head according to an embodiment.
Figure 3B:
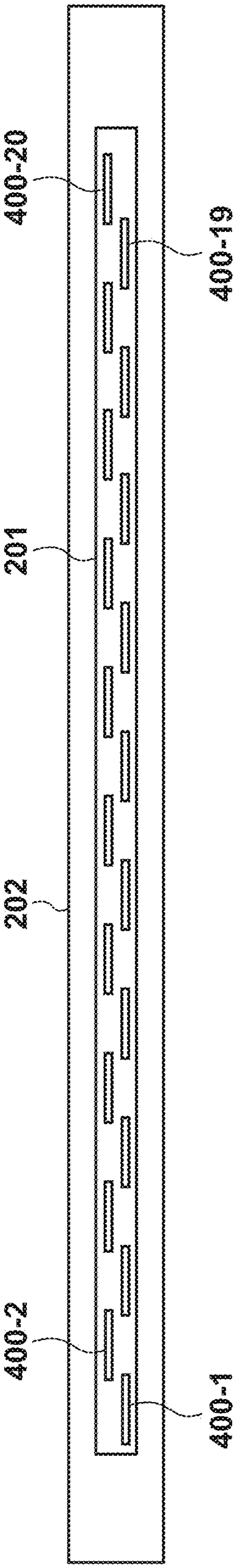

FIG. 3A and FIG. 3B show the printed circuit board 202. Note that FIG. 3A shows a surface on which a connector 305 is mounted, and FIG. 3B shows a surface on which the group of light emitting elements 201 is mounted (a surface opposite to the surface on which the connector 305 is mounted). In the present embodiment, the group of light emitting elements 201 includes 20 light emitting chips 400-1 to 400-20. The light emitting chips 400-1 to 400-20 are arrayed in a two-row zigzag pattern along the main scanning direction. More specifically, light emitting chips **400-(2*k*-1) (where k is an integer from 1 to 10) are arranged in a row along the main scanning direction, and light emitting chips 400-2*k* are arranged in a row along the main scanning direction. The position of the row of light emitting chips 400-(2*k*-1) in the sub scanning direction is different from the position of the row of light emitting chips 400-2*k* in the sub scanning direction. Note that the sub scanning direction is the direction corresponding to the direction of rotation of the photosensitive member 102. Also, the sub scanning direction is the direction perpendicular to the main scanning direction. In the following description, the light emitting chips 400-1 to 400-20 are also collectively referred to as light emitting chips 400. Furthermore, the light emitting chips 400-(2*k*-1) are referred to as light emitting chips 400 of an odd-number row, and the light emitting chips 400-2*k* are referred to as light emitting chips 400 of an even-number row. Each light emitting chip 400 includes a plurality of light emitting elements. Each light emitting chip 400 on the printed circuit board 202 is connected to an image controller 800 (FIG. 8), which is a control unit, via the connector 305**.

Figure 4:
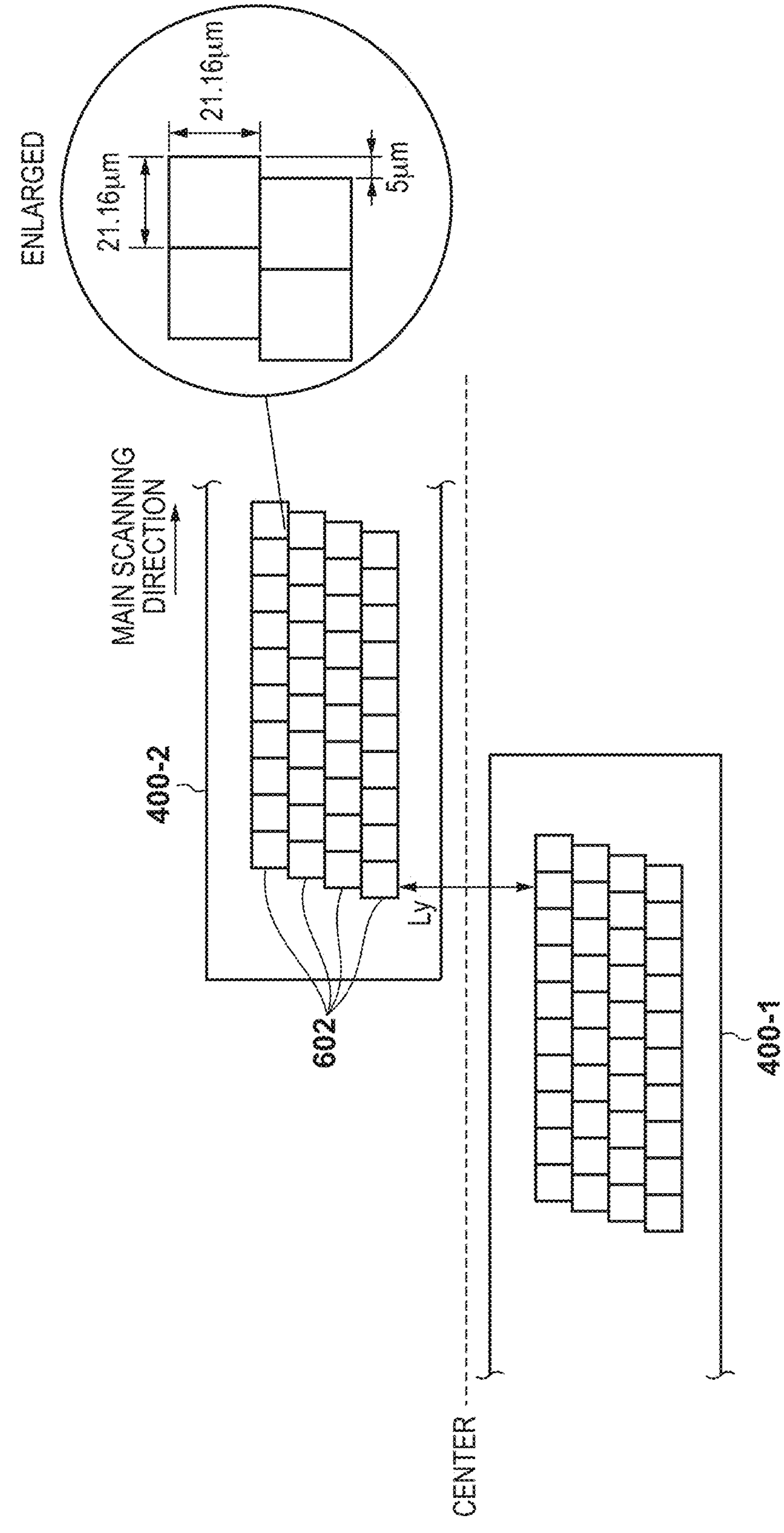
FIG. 4 is a diagram illustrating the arrangement of light emitting elements inside light emitting chips according to an embodiment.

FIG. 4 is a diagram illustrating the arrangement of the light emitting chips 400. In a light emitting chip 400, four sets of light emitting elements 602 are arrayed in the sub scanning direction, each set including 748 light emitting elements arrayed along the main scanning direction. The pitch of light emitting elements 602 that neighbor each other in the main scanning direction is approximately 21.16 μm, which corresponds to a resolution of 1200 dpi. Therefore, the length of 748 light emitting elements in one set in the main scanning direction is approximately 15.8 mm. Note that the sets are placed in such a manner that they are shifted from one another in the main scanning direction by approximately 5 μm, which corresponds to a resolution of 4800 dpi. Furthermore, a light emitting chip 400 in the even-number row and a light emitting chip 400 in the odd-number row are placed so that they overlap in the main scanning direction. An interval Ly between the light emitting elements 602 in a light emitting chip 400 in the even-number row and the light emitting elements 602 in a light emitting chip 400 in the odd-number row is, for example, approximately 105 μm.

Figure 5:
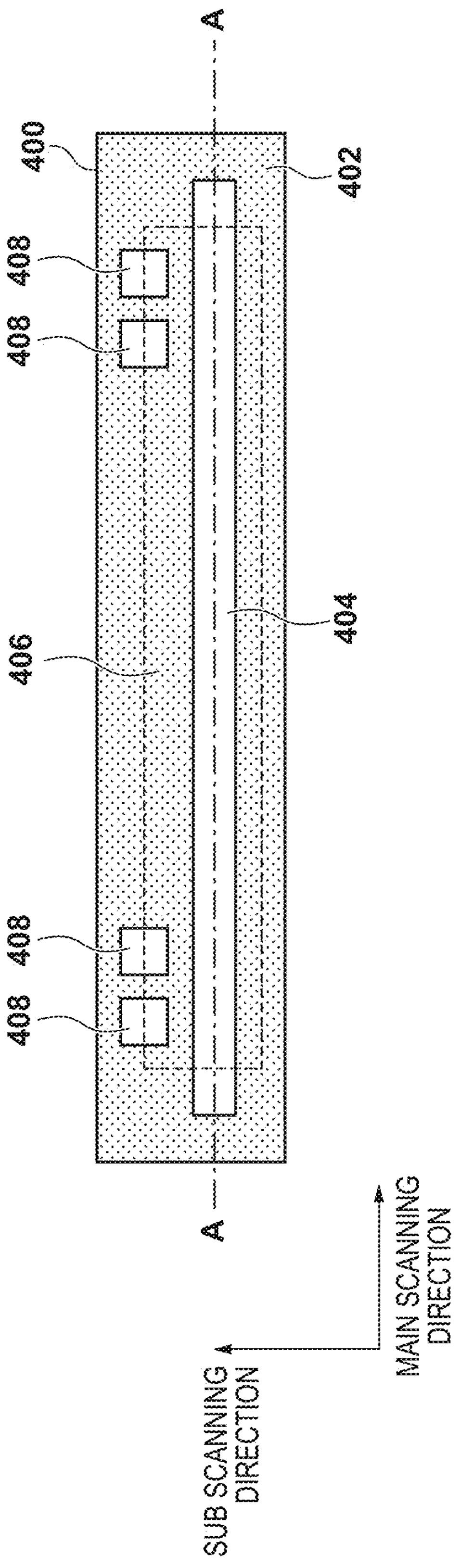
FIG. 5 is a plan view of a light emitting chip according to an embodiment.

FIG. 5 is a plan view of a light emitting chip 400. A light emitting chip 400 has a light emitting unit 404 that includes a plurality of light emitting elements 602. The light emitting unit 404 is formed on a light emitting substrate 402. Also, a circuit unit 406 for controlling the light emitting unit 404 is provided on the light emitting substrate 402. A line for communication with an image controller 800 is connected to pads 408.

Figure 6:
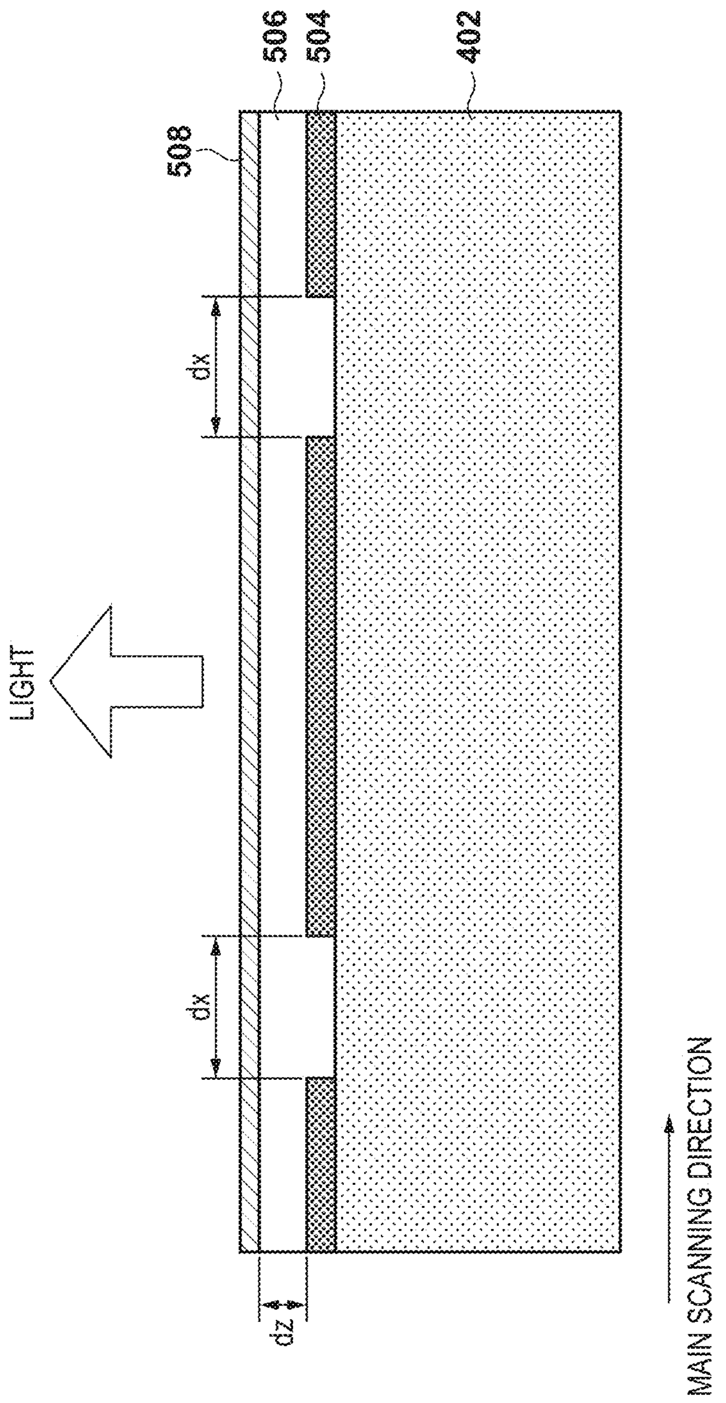
FIG. 6 is a cross-sectional view of a light emitting chip according to an embodiment.

FIG. 6 shows a part of a cross-section taken along the line A-A of FIG. 5. A plurality of lower electrodes 504 are formed on the light emitting substrate 402. A gap having a length dx is present between two neighboring lower electrodes 504. A light emitting layer 506 is provided on the lower electrodes 504, and an upper electrode 508 is provided on the light emitting layer 506. The upper electrode 508 is one shared electrode that corresponds to the plurality of lower electrodes 504. When a predetermined voltage is applied between the lower electrodes 504 and the upper electrode 508, a current flows from the lower electrodes 504 to the upper electrode 508, thereby causing the light emitting layer 506 to emit light. That is to say, a lower electrode 504 is provided in correspondence with one light emitting element 602. By making the length dx large relative to the length dz between the lower electrodes 504 and the upper electrode 508, a leakage current between neighboring lower electrodes 504 can be suppressed, and erroneous light emission by neighboring light emitting elements 602 can be suppressed.

For example, an organic EL film can be used as the light emitting layer 506. Furthermore, an inorganic EL film can be used as the light emitting layer 506. The upper electrode 508 is composed of, for example, a transparent electrode, such as indium tin oxide (ITO), so as to allow the light emission wavelength of the light emitting layer 506 to be transmitted therethrough. Note that although the entirety of the upper electrode 508 allows the light emission wavelength of the light emitting layer 506 to be transmitted therethrough in the present embodiment, it is not necessary for the entirety of the upper electrode 508 to allow the light emission wavelength to be transmitted therethrough. Specifically, it is sufficient that the light emission wavelength be transmitted through the regions via which light beams from the respective light emitting elements 602 (corresponding to the lower electrodes 504) are emitted.

Figure 7:
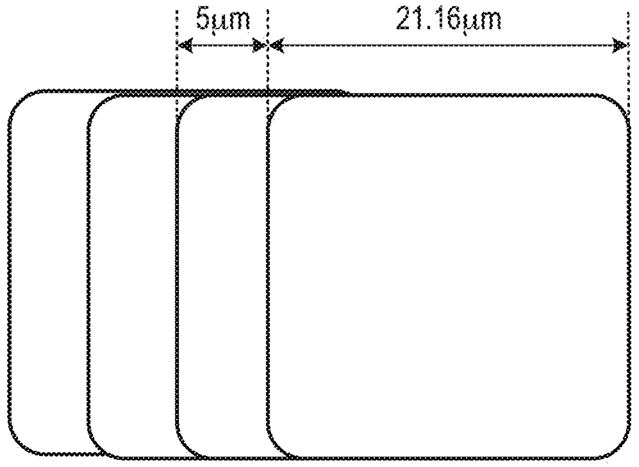
FIG. 7 is a diagram showing spots on a photosensitive member according to an embodiment.

As has been described using FIG. 4, one light emitting chip 400 includes four sets of multiple light emitting elements 602 that are arranged along the main scanning direction, and one of the sets that neighbor each other in the sub scanning direction is shifted from the other in the main scanning direction by 5 μm. In exposing one line of the photosensitive member 102 to light, the light emission timings of the four sets are controlled so as to expose this line of the photosensitive member 102 to light. Therefore, as shown in FIG. 7, the four light emitting elements 602 in the four sets that are located at the substantially same position in the main scanning direction expose the photosensitive member 102 to light at the positions that are shifted from one another by 5 μm. In this way, as the spots made by the respective light emitting elements 602 overlap one another, a smooth electrostatic latent image is formed. Note that although the number of sets is four in the present embodiment, the number of sets can be two or more.

As described above, the exposure head 106 according to the present embodiment includes 20 light emitting chips 400 that are arrayed in a two-row zigzag pattern along the main scanning direction, and each light emitting chip 400 includes four sets of multiple light emitting elements 602 that are arrayed along the main scanning direction. The sets are arranged along the sub scanning direction, and the position of one of neighboring sets in the main scanning direction is shifted from the position of the other in the main scanning direction by 5 μm, which corresponds to a resolution of 4800 dpi. Looking at the entirety of the exposure head 106, the respective positions of the plurality of light emitting elements 602 in the main scanning direction differ from one another. Note that although the positions of the plurality of light emitting elements 602 in the sub scanning direction are not the same, the light emission timings of the respective light emitting elements 602 are adjusted so as to expose the same line of the photosensitive member 102 to light. Therefore, the spots that are respectively made by the plurality of light emitting elements 602 can be formed on one line, along the main scanning direction, on the photosensitive member 102 at an interval of approximately 5 μm. In the following description, the positions at which the plurality of light emitting elements 602 respectively form the spots are referred to as "dots". Furthermore, in a case where a light emitting element 602 is caused to emit light at a position of a dot, this dot is referred to as an "exposure dot"; in a case where a light emitting element 602 is not caused to emit light at a position of a dot, this dot is referred to as a "non-exposure dot".

Figure 8:
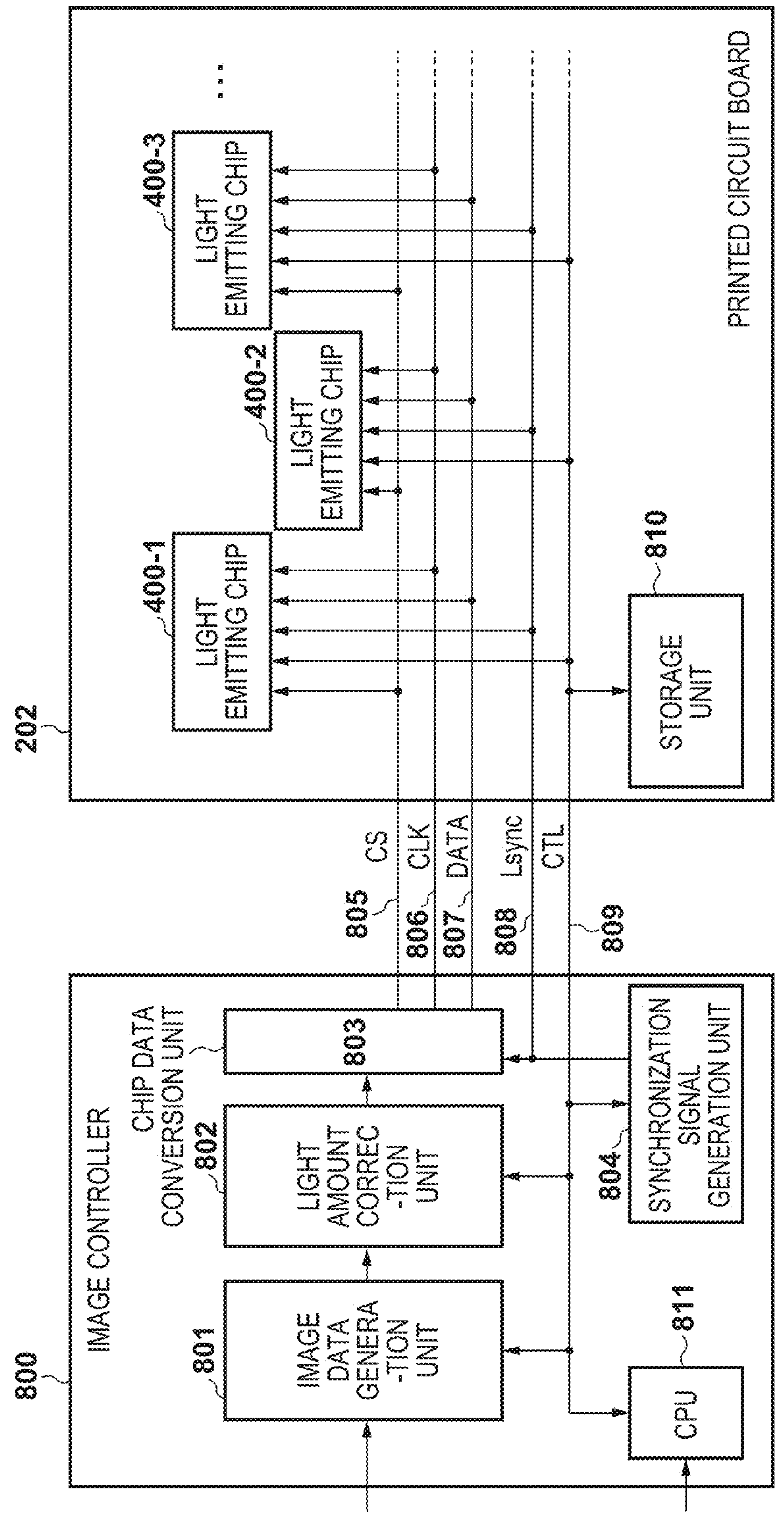
FIG. 8 is a diagram of a configuration for controlling each light emitting chip according to an embodiment.

FIG. 8 shows a configuration in which the image controller 800 controls each light emitting chip 400. Image data indicating the tone values of respective pixels in an image to be formed is input to an image data generation unit 801. The image data generation unit 801 performs dithering processing (halftone processing) with respect to this image data in accordance with a resolution designated by a CPU 811, and outputs the image data after the processing to a light amount correction unit 802. The image data after the halftone processing indicates whether each dot that composes the image is to be an exposure dot or a non-exposure dot. In other words, the image data after the halftone processing indicates whether to cause the light emitting elements 602 corresponding to the respective dots to emit light. The light amount correction unit 802 performs light amount correction with respect to the image data based on correction information, and outputs the image data after the light amount correction to a chip data conversion unit 803. A synchronization signal generation unit 804 generates a line synchronization signal (Lsync) 808. The line synchronization signal 808 is used to determine, from the image data, a data portion corresponding to one line of the photosensitive member 102 in the main scanning direction. The chip data conversion unit 803 transmits image data (DATA) 807 corresponding to one line to each light emitting chip 400 in synchronization with the line synchronization signal 808. Note that a chip selection signal (CS) 805 indicates to which light emitting chip 400 the image data 807 is addressed. Furthermore, the chip data conversion unit 803 transmits a clock signal (CLK) 806 to each light emitting chip 400.

Correction information, which will be described later, is stored in a storage unit 810 of the printed circuit board 202. Note that each block shown in FIG. 8 is configured to be capable of exchanging various types of information by way of transmission and reception of a control signal (CTL) 809. Upon receiving the image data 807 from the chip data conversion unit 803, each light emitting chip 400 performs a light emitting operation in accordance with the received image data 807 at an input timing of the next line synchronization signal 808.

Figure 9:
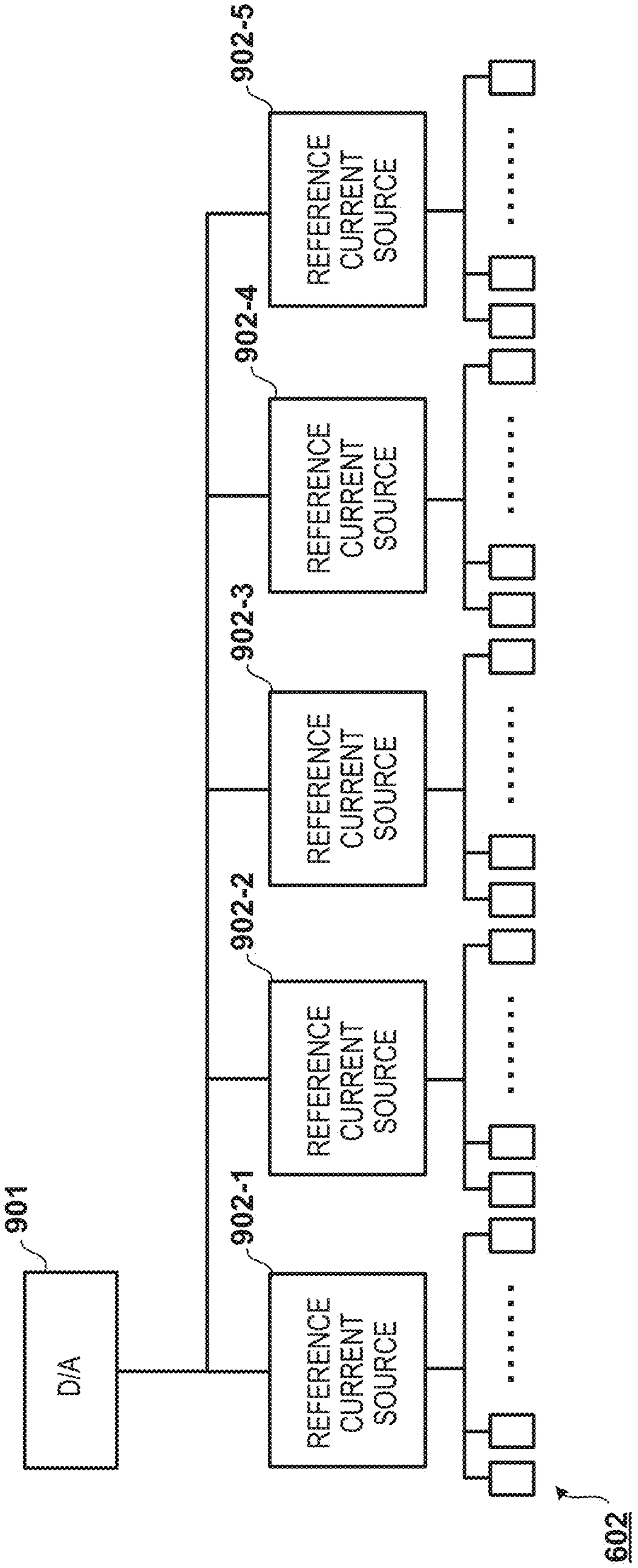
FIG. 9 is a diagram of blocks inside a light emitting chip according to an embodiment.

FIG. 9 is a block diagram of a light emitting chip 400. A digital/analog converter (D/A) 901 outputs an analog voltage corresponding to a digital value, which is a setting value that has been set by the CPU 811. This digital value is indicated by the correction information; the CPU 811 determines the digital value to be set for the D/A 901 in each light emitting chip 400 by reading out the correction information stored in the storage unit 810. The light emitting elements 602 in a light emitting chip 400 are grouped into a plurality of blocks in the main scanning direction. Each group is provided with one corresponding reference current source 902. In FIG. 9, the light emitting elements 602 are grouped into five groups, and thus the light emitting chip 400 includes reference current sources 902-1 to 902-5 that respectively correspond to the groups. The reference current sources 902-1 to 902-5 output a reference current corresponding to the output value output from the D/A 901, that is to say, the analog voltage, to each light emitting element 602 in the corresponding group. In this way, the D/A 901 functions as a current control unit that that controls a reference current to the light emitting elements 602. The light emission amounts of the light emitting elements 602 are controlled based on the reference current output from the corresponding reference current source 902.

Figure 10:
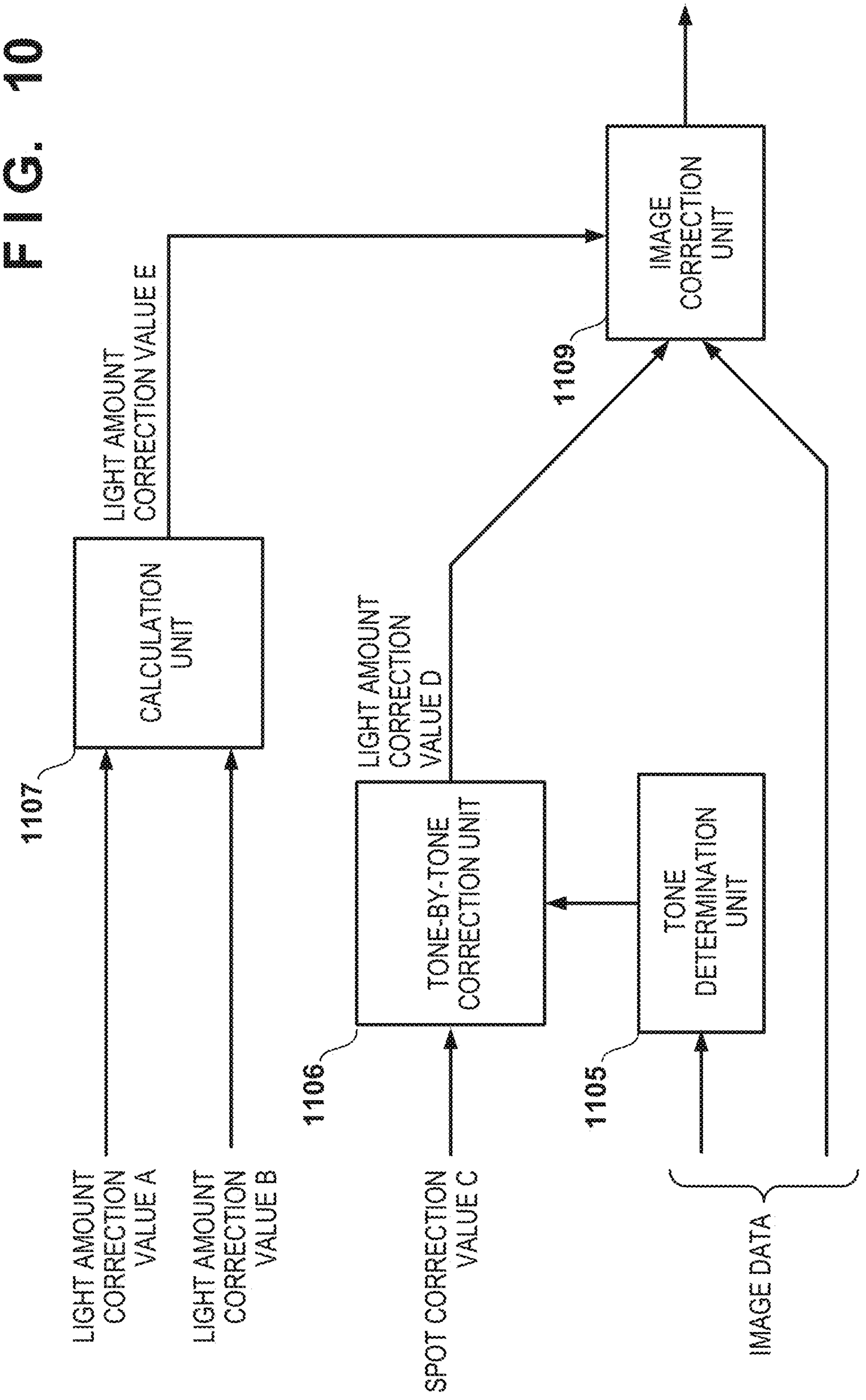
FIG. 10 is a block diagram of a light amount correction unit according to an embodiment.

FIG. 10 is a block diagram of the light amount correction unit 802. The correction information indicates light amount correction values A, light amount correction values B, and spot correction values C. The CPU 811 notifies the light amount correction unit 802 of the light amount correction values A, light amount correction values B, and spot correction values C by reading out the correction information stored in the storage unit 810.

The light amount correction values A are correction values for correcting the light amount differences among the groups of a light emitting chip 400. In the present embodiment, as the light emitting elements 602 inside one light emitting chip 400 are grouped into five groups, five light amount correction values A are set with respect to one light emitting chip 400. One group, that is to say, one reference current source 902 is associated with one light amount correction value A.

The light amount correction values B are correction values for correcting the light amount differences among the light emitting elements 602 inside a group. While the details will be described later, four light amount correction values B are associated with one group of one light emitting chip 400 in the present embodiment. For example, a plurality of light emitting elements 602 that emit light based on the reference current from one reference current source 902 are sub-grouped into four sub-groups in accordance with the positions in the main scanning direction. Note that the light emitting elements 602 included in one sub-group form spots continuously in the main scanning direction. Then, one light amount correction value B is associated with one sub-group.

A spot correction value C is a value which is intended to correct a light amount difference attributed to the expansion of a spot made by a light emitting element 602 in the main scanning direction, and which indicates the amount of displacement of the spot (hereinafter, a spot displacement amount) from a reference value. A spot correction value C is set for each light emitting element 602 that makes an expanded spot. Note that a light emitting element 602 for which no spot correction value C is set is construed to have a spot correction value C of 0. While the details will be described later, in a case where a spot made by a light emitting element 602 is expanded in the main scanning direction, the influence thereof varies depending on the tones. Specifically, in the case of a high tone, the density increases as a spot expands in the main scanning direction. Therefore, in a case where a spot for forming a portion with a high tone value is expanded in the main scanning direction, the light amount is reduced. On the other hand, in the case of a low tone, the density decreases as a spot expands in the main scanning direction. Therefore, in a case where a spot for forming a portion with a low tone value is expanded in the main scanning direction, the light amount is increased. Note that the absolute value of the amount of increase or decrease in the light amount increases with an increase in a spot displacement amount.

The correction information that includes the light amount correction values A, light amount correction values B, and spot correction values C is stored into the storage unit 810 before shipment. Furthermore, the CPU 811 can update the correction information stored in the storage unit 810 by obtaining the light amount correction values A, light amount correction values B, and spot correction values C using a method described later.

The image data that has undergone the dithering processing in the image data generation unit 801 is input to a tone determination unit 1105 and an image correction unit 1109. As stated earlier, this image data indicates whether to cause each light emitting element 602 to emit light when exposing each line of the photosensitive member 102 in the main scanning direction to light.

The tone determination unit 1105 determines the tone values of pixels based on the input image data, and notifies a tone-by-tone correction unit 1106 of the same. The tone-by-tone correction unit 1106 includes a tone-by-tone correction table. Note that the correction table is included in the correction information. The correction table is a table that indicates a reference light amount correction value on atone-by-tone basis. Note that a reference light amount correction value having a positive value indicates that the light amount is to be increased, whereas a reference light amount correction value having a negative value indicates that the light amount is to be reduced. As stated earlier, in a case where a spot is expanded in the main scanning direction, the influence thereof varies depending on the tones. For example, assume that the tones are categorized into three types, namely a low tone, an intermediate tone, and a high tone, with use of a first threshold and a second threshold. Note that the first threshold is larger than the second threshold, a tone value larger than the first threshold represents a high tone, a tone value smaller than the second threshold represents a low tone, and a tone value larger than or equal to the second threshold and smaller than or equal to the first threshold represents an intermediate tone. A reference light amount correction value indicated by the correction table has a positive value for a low tone, has a negative value for a high tone, and is 0 for an intermediate tone. In other words, a negative reference light amount correction value is 0 for a low tone and an intermediate tone, and a positive reference light amount correction value is 0 for a high tone and an intermediate tone.

The tone-by-tone correction unit 1106 corrects the reference light amount correction value of the tone of a pixel notified by the tone determination unit 1105 based on the spot displacement amount indicated by the spot correction value C of the light emitting element 602 that forms a dot composing this pixel, thereby obtaining a light amount correction value D of this dot. As one example, the tone-by-tone correction unit 1106 holds coefficient information indicating a correspondence relationship between spot displacement amounts and coefficients, and obtains the light amount correction value D by multiplying the reference light amount correction value of the tone notified by the tone determination unit 1105 by a coefficient corresponding to the spot displacement amount. Note that the light amount correction value D of a dot formed by a light emitting element 602 for which no spot correction value C has been set, that is to say, a light emitting element 602 with a spot correction value C of 0, is always 0. The tone-by-tone correction unit 1106 outputs data indicating the light amount correction values D of the respective dots that compose the image to the image correction unit 1109.

Based on the light amount correction values A and the light amount correction values B, a calculation unit 1107 obtains light amount correction values E of the respective light emitting elements 602 that are placed at different positions in the main scanning direction. The light amount correction value E of a light emitting element 602 is a sum of the light amount correction value A of the group to which this light emitting element 602 belongs, and the light amount correction value B of the sub-group to which this light emitting element 602 belongs. While the details will be described later, the value of the sum of the light amount correction value A of the group to which a light emitting element 602 belongs, and the light amount correction value B of the sub-group to which this light emitting element 602 belongs, is 0 or a negative value, and does not become a positive value. That is to say, this value of the sum is a value indicating that the light amount is to be maintained as is or reduced, and does not become a value indicating that the light amount is to be increased. The light amount correction values E are also correction values for the light amounts of the respective dots on one line in the main scanning direction, which are formed by the light emitting elements 602 placed at different positions in the main scanning direction. The calculation unit 1107 outputs the light amount correction values E of the respective dots on one line in the main scanning direction to the image correction unit 1109.

Figure 11A:
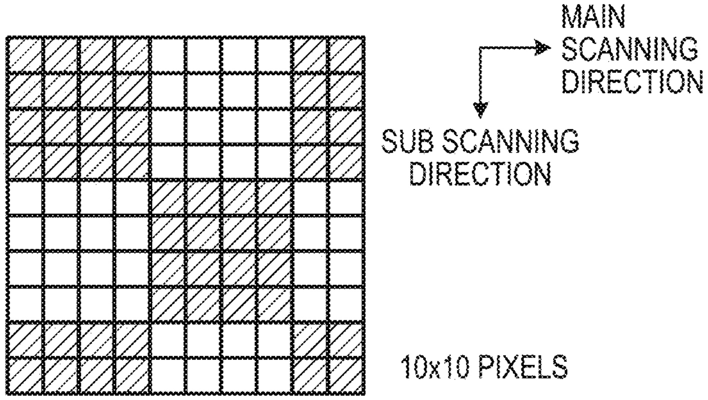
FIG. 11A to FIG. 11D are diagrams illustrating processing in the light amount correction unit according to an embodiment.

The image correction unit 1109 divides the data indicating the light amount correction values D of the respective dots that compose the image into first data indicating the light amount correction values D of dots for increasing the light amount, and second data indicating the light amount correction values D of dots for reducing the light amount. Furthermore, based on the light amount correction values E of the respective dots on one line in the main scanning direction, the image correction unit 1109 generates third data indicating the light amount correction values E of the respective dots that compose the image. Then, the image correction unit 110) adds the absolute values of the light amount correction values D in the second data and the absolute values of the light amount correction values E of the same dots in the third data, thereby generating fourth data indicating the total light amount correction values of the respective dots that compose the image. The total light amount correction values of the respective dots indicated by the fourth data indicate that the amount of reduction in the light amount is 0 or more, and will be hereinafter referred to as subtraction data. On the other hand, the light amount correction values D of the respective dots indicated by the first data indicate that the amount of increase in the light amount is 0 or more, and will be hereinafter referred to as addition data. The image correction unit 1109 corrects the image data based on the subtraction data and the addition data. In the present embodiment, the image correction unit 1109 performs image correction in units of partial images of a predetermined size, which are parts of the image to be formed. In the present example, it is assumed that the size of a partial image is 10×10 pixels (a total of 100 pixels). FIG. 11A shows one example of a partial image, which is a portion corresponding to 10×10 pixels in the image formed by the pre-correction image data. In FIG. 11A, one cell represents one pixel. Note that hatched pixels denote pixels to which toner is to be applied, whereas white pixels denote pixels to which toner is not to be applied.

Figure 11B:
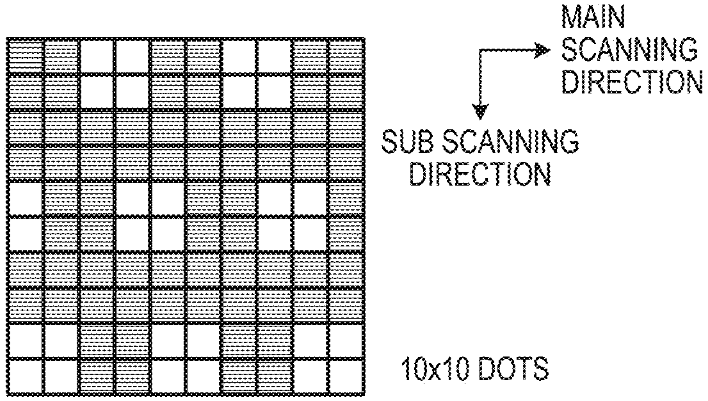

In the present embodiment, it is assumed that one pixel is formed of 10 continuous dots, both in the main scanning direction and in the sub scanning direction. FIG. 11B shows an example of image data for forming one pixel of FIG. 11A. Hereinafter, the 10 light emitting elements 602 in the main scanning direction that form one pixel of FIG. 11B will be referred to as light emitting elements #1 to #10. In FIG. 11B, the $K^{th}$ cell from the left (where K is an integer from 1 to 10) denotes a dot (spot) made by the light emitting element #K. Specifically, a hatched cell denotes an exposure dot, or indicates that the light emitting element #K is to emit light, whereas a white cell denotes a non-exposure dot, or indicates that the light emitting element #K is not to emit light. Note that the up-down direction in FIG. 11B corresponds to positions in the sub scanning direction. According to the illustration, for example, the light emitting element #1 emits light at the first to fourth positions, the seventh position, and the eighth position among the positions of formation of 10 dots in the sub scanning direction. FIG. 11B can be deemed to show whether each of the 10×10 dots that form one pixel is an exposure dot or a non-exposure dot.

Figure 11C:
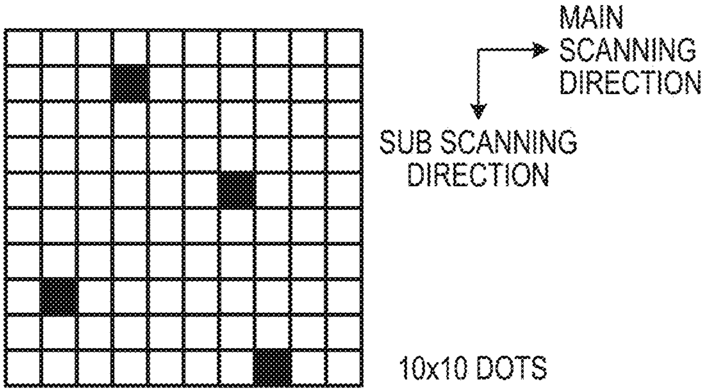
Figure 11D:
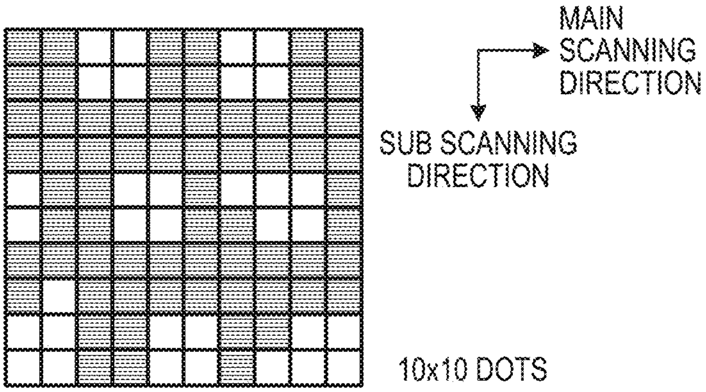

Below, the dots (spots) shown in FIG. 11B to FIG. 11D are identified using the numbers in the main scanning direction and the sub scanning direction. Regarding the numbers in the main scanning direction, the leftmost dot is denoted by 1, and the rightmost dot is denoted by 10. Regarding the numbers in the sub scanning direction, the uppermost dot is denoted by 1, and the lowermost dot is denoted by 10. Furthermore, for example, the dot that is positioned second in the main scanning direction and the third in the sub scanning direction is denoted by (2, 3).

The image correction unit 1109 includes a threshold matrix table for subtraction, and a threshold matrix table for addition. The threshold matrix tables are tables indicating thresholds for 10×10 pixels, namely 100×10 dots targeted for image correction. The image correction unit 1109 compares the absolute value of the total light amount correction value of a dot corresponding to a partial image among the dots in the image indicated by the subtraction data, with the corresponding threshold for the dot indicated by the threshold matrix table for subtraction. Then, the image correction unit 1109 determines a dot for which the absolute value of the total light amount correction value exceeds the threshold in the threshold matrix table for subtraction as a first change dot.

FIG. 11C shows an example of the result of determination that has been made using the threshold matrix table for subtraction with respect to a portion equivalent to one pixel corresponding to FIG. 11B. In FIG. 11C, the dots at the positions (4, 2), (7, 5), (2, 8), and (8, 10) are determined as the first change dots. In a case where a first change dot is an exposure dot, the image correction unit 1109 changes this first change dot to anon-exposure dot. On the other hand, in a case where a first change dot is a non-exposure dot, the image correction unit 1109 leaves this first change dot as the non-exposure dot. Therefore, the image correction unit 1109 corrects the image data of FIG. 11B as shown in FIG. 11D. The dot at the position (4, 2) in FIG. 11B is originally a non-exposure dot, and thus still remains as the non-exposure dot after the correction. On the other hand, the dots at the positions (7, 5), (2, 8), and (8, 10) have been corrected from exposure dots to non-exposure dots.

The image correction unit 1109 similarly determines second change dots using the addition data and the threshold matrix table for addition. In a case where a second change dot is a non-exposure dot, the image correction unit 1109 changes this second change dot to an exposure dot. On the other hand, in a case where a second change dot is an exposure dot, the image correction unit 1109 leaves this second change dot as the exposure dot. In a case where the same dot has been selected both as a first change dot and as a second change dot, the image correction unit 1109 does not change the exposed/non-exposed state of this dot, and leaves this dot in a state indicated by the original image data. Note that tables with high spatial-frequency characteristics, which are used in a commonly-known blue noise mask method, can be used as the threshold matrix tables.

Regarding the threshold matrix tables (100×100 dots in the present example), the same tables are repeatedly used in the main scanning direction and the sub scanning direction. However, as the subtraction data and the addition data to be compared correspond to the entirety of the image and are not something that are repeated in a certain cycle, the occurrence of image defects on the borders of processing can be suppressed. Note that the thresholds of the threshold matrix tables are set so that the interval between the first change dots and the interval between the second change dots are not even. The occurrence of moire can be prevented by making the interval between the first change dots and the interval between the second change dots uneven.

Furthermore, the light amount can be corrected with high precision by using a correction resolution that is sufficiently high relative to the pixel size of the original image data. In addition, by correcting the light amount before the chip data conversion unit 803 performs the division into pieces of image data for the respective light emitting chips 400, the occurrence of image defects on the borders of the light emitting chips 400 can be suppressed compared to a configuration that corrects the light amount after the division.

As described above, according to the present embodiment, exposure/non-exposure of dots obtained by dividing one pixel shown in image data is corrected in units of partial images of a predetermined area (10×10 pixels in the present example). With this configuration, simple and high-precision correction can be performed compared to correction of the light amount using complicated analog circuits. Furthermore, the occurrence of image defects can be prevented by correcting the light amount based on the light amount correction values of the respective light emitting elements 602 that continuously form spots in the main scanning direction, that is to say, the light amount correction values of the respective positions that are continuous in the main scanning direction. In addition, the light amount can be corrected with high precision by correcting the light amount in units of dots obtained by dividing one pixel.

In the present embodiment, the fluctuations in the light amounts of the light emitting elements 602 in the main scanning direction are corrected in two steps. First, as correction in a first step, the fluctuations in the light amount between the light emitting chips 400 are corrected by adjusting the digital values set in the D/As 901 of the light emitting chips 400. In order to decide on the digital value to be set in the D/A 901 of each light emitting chip 400, all of the light emitting elements 602 inside the light emitting chip 400 are caused to emit light, and the light amount value of each light emitting element 602 in this light emitting chip 400 is measured. Then, the digital value to be set in the D/A 901 is decided on so that the smallest one of the light amounts of the light emitting elements 602 inside the light emitting chip 400 is used as a target light amount. In this way, the light amounts of all of the light emitting elements 602 inside the light emitting chip 400 are equal to or larger than the target light amount. Therefore, as stated earlier, the light amount correction value E of each light emitting element is a value indicating that the light amount is to be maintained as is or reduced. By correcting the light amount in the first step using the digital values set in the D/As 901, the amount of correction in the light amount correction unit 802 can be reduced, and as a result, deterioration in the image quality caused by correction of image data can be suppressed.

Correction in a second step is correction of the fluctuations in the light amount inside a light emitting chip 400, and is executed by the light amount correction unit 802 correcting image data in the above-described manner. The light amount correction values A, light amount correction values B, and spot correction values C used by the light amount correction unit 802, as well as the aforementioned digital values input to the D/As 901 of the respective light emitting chips 400, are generated based on the result of measurement during an assembly and adjustment process for the exposure head 106, and stored into the storage unit 810 as the correction information. The CPU 811 reads out the correction information, sets the light amount correction values A, light amount correction values B, and spot correction values C in the light amount correction unit 802, and further sets digital values in the D/As 901 of the respective light emitting chips 400.

Note that a spot correction value C indicates the amount of displacement of a spot from a reference value (a spot displacement amount). In order to measure the spot correction values C, each of the light emitting elements 602 is caused to emit light individually. Then, the spot sizes are measured by reading the spots using a CCD camera, the amounts of change from the reference value are measured, and the relationships with the occurrence positions, that is to say, the light emitting elements 602 are used as the spot correction values C.

Figure 12:
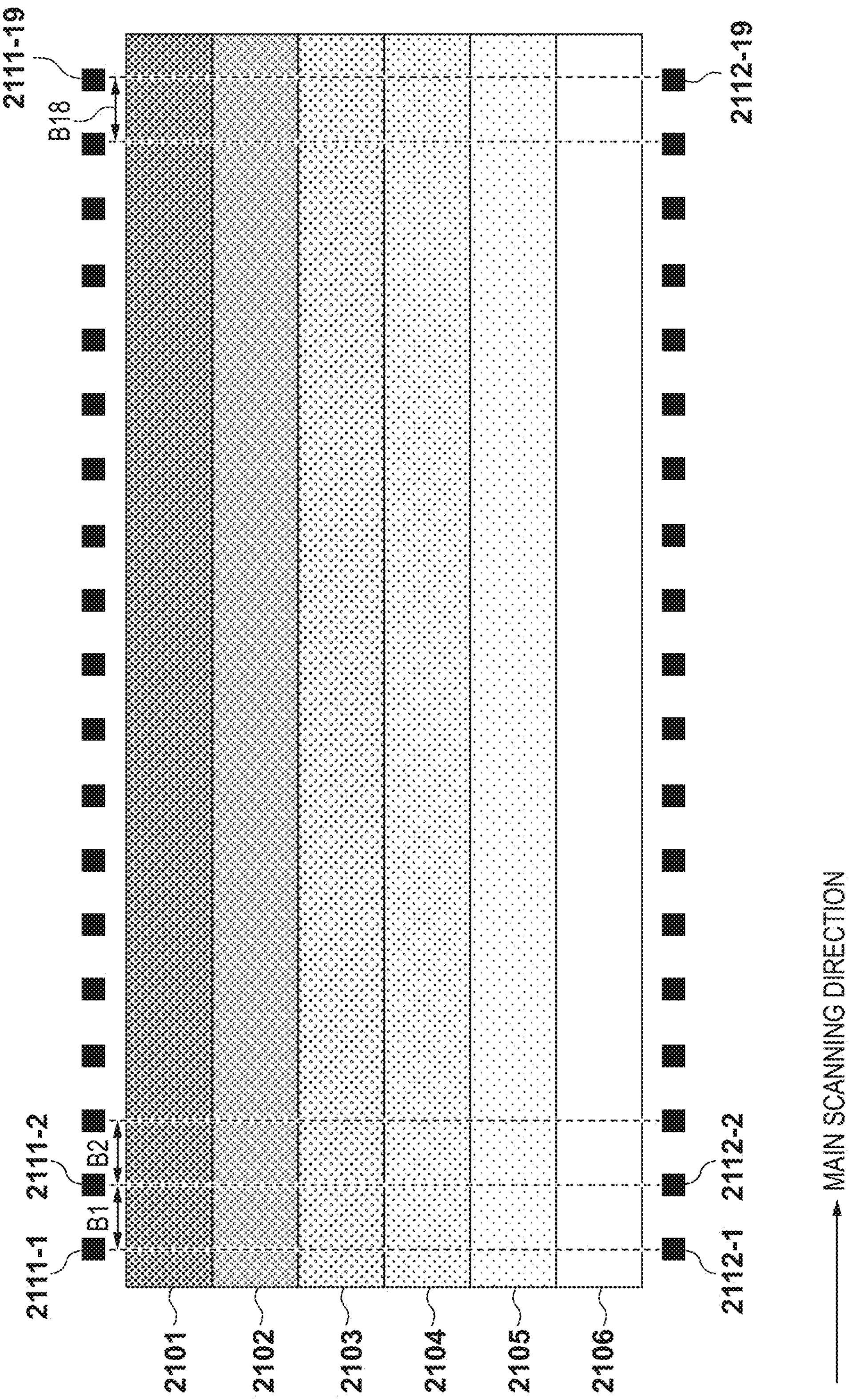
FIG. 12 is a diagram showing a light amount correction chart according to an embodiment.

Note that the correction information can be generated inside the image forming apparatus. FIG. 12 shows a light amount correction chart, which is a measurement image formed on a sheet in order to generate the correction information. The light amount correction chart is formed by the image forming apparatus in response to an instruction issued by a user to execute the adjustment of unevenness in the light amount. The user causes the reading unit 100 to read the sheet on which the light amount correction chart has been formed. Consequently, the CPU 811 obtains chart data, which is the result of reading by the reading unit 100. The chart data is data that indicates a density distribution in the main scanning direction for each of a plurality of tone images 2101 to 2106.

The light amount correction chart includes the plurality of tone images 2101 to 2106 that are in the shape of a strip along the main scanning direction, and reference marks 2111-1 to 2119-19 and 2112-1 to 2112-19 that are placed above and below the tone images 2101 to 2106. Each reference mark is a marker image for specifying the position of each light emitting chip 400, and is formed by emission of light by the light emitting elements 602 located on the edge of each light emitting chip 400 in the main scanning direction. For example, the reference mark 2111-2 is formed by emission of light by four light emitting elements 602 on the right edge of the light emitting chip 400-2, and four light emitting elements 602 on the left edge of the light emitting chip 400-3. The CPU 811 determines each reference mark based on the chart data. Then, with respect to each of the tone images 2101 to 2106, the CPU 811 determines the regions that have been formed respectively by the light emitting chips 400-1 to 400-20 with use of the lines connecting the reference marks 2111-*p* (where p is an integer from 1 to 19) and the reference marks 2112-*p*. For example, it is determined that a region B1 (among regions B1-B18) in FIG. 12 has been formed by the light emitting chip 400-2. Note, it is determined that the left edge of FIG. 12 has been formed by the light emitting chip 400-1, and the right edge of FIG. 12 has been formed by the light emitting chip 400-20. Therefore, it follows that region B2 has been formed by the light emitting chip 400-3 and that region B18 has been formed by the light emitting chip 400-19.

The set of tone images 2101 and 2102 is formed from pieces of image data having the same tone value. However, in forming the tone image 2102, the CPU 811 reduces the digital value to be set in the D/A 901 of each light emitting chip 400, by a predetermined rate, compared to the digital value that was set in the D/A 901 of each light emitting chip 400 in forming the tone image 2101. This makes the density of the tone image 2102 lower than the density of the tone image 2101. The same goes for the set of tone images 2103 and 2104, and the set of tone images 2105 and 2106. Note that the tone values indicated by pieces of image data that are respectively used to form the set of tone images 2101 and 2102, the set of tone images 2103 and 2104, and the set of tone images 2105 and 2106 differ from one another. Specifically, the pieces of image data for forming the set of tone images 2101 and 2102 are set to indicate the largest tone value, and the pieces of image data for forming the set of tone images 2105 and 2106 are set to indicate the smallest tone value. Note that the density of the tone image 2102 is higher than the density of the tone image 2103, and the density of the tone image 2104 is higher than the density of the tone image 2105.

Figure 13:
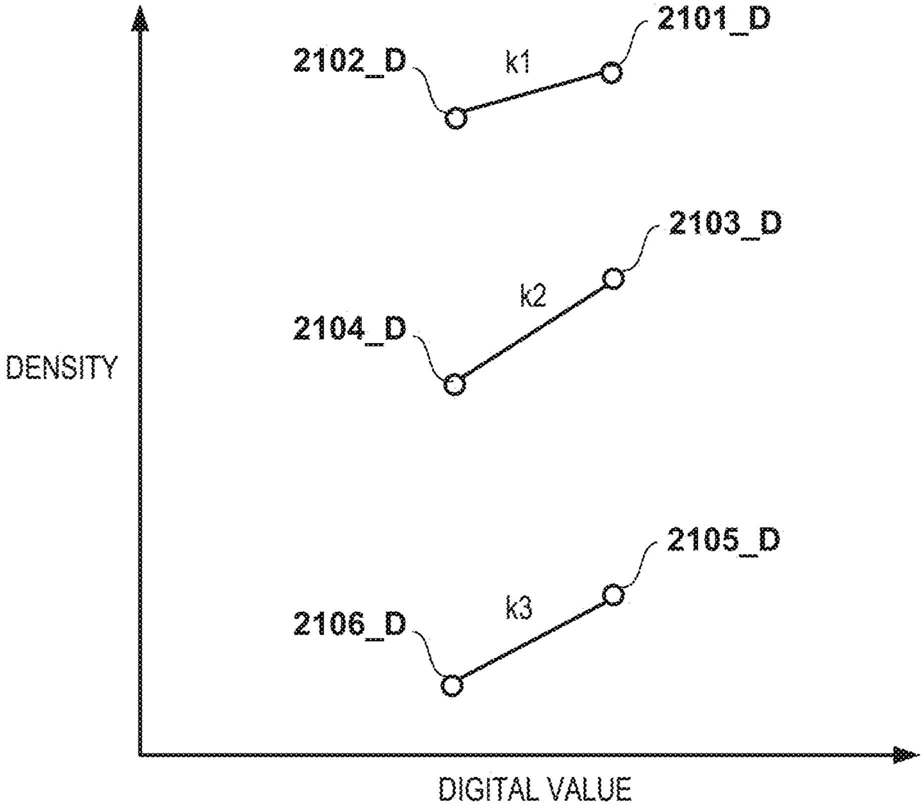
FIG. 13 is a diagram illustrating processing for generating correction information according to an embodiment.

Next, a method of converting the chart data read by the reading unit 100 into light amount data will be described using FIG. 13. The CPU 811 obtains average densities 2101_D to 2106_D of the tone images 2101 to 2016, respectively, by averaging the densities read at respective positions in the main scanning direction. FIG. 13 shows a relationship between the digital values that were set in the D/As 901 in forming the tone images 2101 to 2106, respectively, and the average densities 2101_D to 2106_D. With respect to the set of tone images 2101 and 2102, the CPU 811 obtains the amount of change k1 in the digital value relative to the change in density. Specifically, the CPU 811 obtains the amount of change k1 by dividing the difference between the digital values that were set in the D/As 901 in forming the tone images 2101 and 2102 by the difference between the average density 2101_D and the average density 2102_D. Similarly, the CPU 811 obtains the amount of change k2 for the set of tone images 2103 and 2104, and the amount of change k3 for the set of tone images 2104 and 2105.

The CPU 811 obtains a light amount distribution of the tone image 2101 in the main scanning direction by multiplying the densities at respective positions of the tone image 2101 in the main scanning direction, which are determined based on the chart data, by the inclination k1. Similarly, the CPU 811 obtains the light amount distribution in the main scanning direction with respect to the tone image 2103 and the tone image 2105 as well. Note that it is also permissible to adopt a configuration in which the light amount distribution is obtained by changing the tones of the pieces of image data for forming the tone images 2101 and 2102, instead of changing the digital values set in the D/As 901.

In the present embodiment, the CPU 811 obtains the digital values set in the D/As 901, the light amount correction values A, and the light amount correction values B based on the light amount distribution of the tone image 2103, which is an image of an intermediate-density region. Furthermore, the CPU 811 obtains the spot correction values C based on the light amount distributions of the tone image 2101 and the tone image 2105, which are a high-density region and a low-density region, respectively. Below, a method of obtaining the digital values set in the D/As 901, the light amount correction values A, and the light amount correction values B will be described using FIG. 14.

Figure 14:
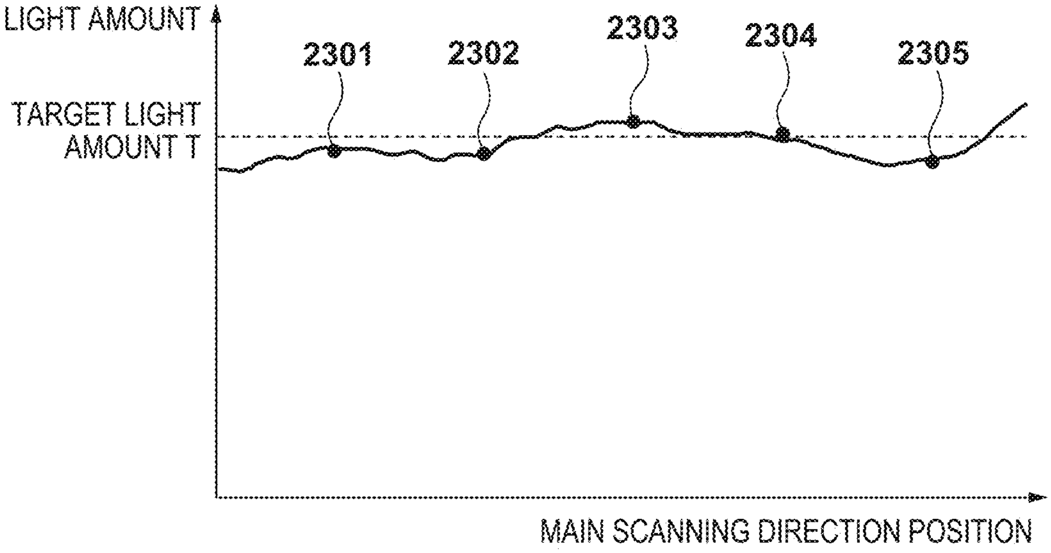
FIG. 14 is a diagram illustrating processing for generating correction information according to an embodiment.

FIG. 14 shows the light amount distribution of the tone image 2103. Note that FIG. 14 only shows a portion corresponding to one light emitting chip 400. As has been described using FIG. 12, which portion of the tone image 2103 was formed by which light emitting chip 400 can be determined using the reference marks. The CPU 811 decides on the digital value to be set in the D/As 901 so that the smallest light amount in FIG. 14 is used as a target light amount T (a target value). Specifically, the CPU 811 decides on the digital value to be set in the D/As 901 by increasing the digital value that was set in the D/As 901 in forming the tone image 2103 by a digital value corresponding to a value obtained by subtracting the smallest light amount in FIG. 14 from the target light amount T.

A light amount 2301 in FIG. 14 is a light amount at a predetermined position inside a range where dots are formed by the plurality of light emitting elements 602 inside the group corresponding to the reference current source 902-1. Similarly, light amounts 2302 to 2305 are respectively light amounts at predetermined positions inside the ranges where dots are formed by the plurality of light emitting elements 602 inside the groups corresponding to the reference current sources 902-2 to 902-5. For example, the CPU 811 uses the difference between the light amount 2301 and the smallest light amount in FIG. 14 as the light amount correction value A associated with the reference current source 902-1. Note that as stated earlier, due to the digital value set in the D/As 901, the smallest light amount in FIG. 14 is used as the target light amount T. The CPU 811 similarly obtains the light amount correction values A associated with the reference current sources 902-2 to 902-5 as well.

Furthermore, for example, the CPU 811 determines the light amounts at four positions from within the range where dots are formed by the plurality of light emitting elements 602 inside the group corresponding to the reference current source 902-1. Note that the positions at which the light amounts are determined are each selected from within the range where dots are formed by the plurality of light emitting elements 602 in one sub-group. The CPU 811 uses the differences between the four determined light amounts and the light amount 2301 as the light amount correction values B that are associated with the respective sub-groups under the reference current source 902-1. The CPU 811 similarly obtains the light amount correction values B associated with the reference current sources 902-2 to 902-5 as well.

As described above, the entirety of the light emitting elements 602 inside a group is corrected using a light amount correction value A, which is based on a reference current source 902, and the fluctuations in the light amounts of the light emitting elements 602 inside the group are corrected using light amount correction values B. With this configuration, light amount correction values B can be represented using a small number of bits, and the data amount of the correction information can be reduced. As one example, a light amount correction value A can be represented using four bits, and light amount correction values B indicating the fluctuations in the light amounts inside a group, that is to say, residual components can be represented using two bits.

Figure 15A:
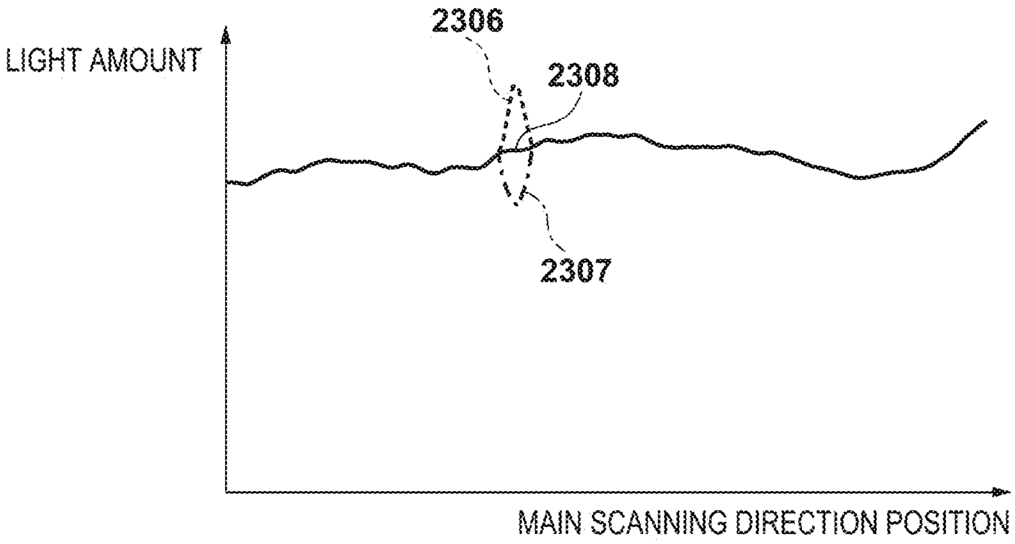
FIG. 15A and FIG. 15B are diagrams illustrating processing for generating correction information according to an embodiment.

Next, a method of obtaining the spot correction values C will be described. FIG. 15A shows the light amount distributions of the tone images 2101, 2103, and 2105. Note that FIG. 15A shows normalized light amounts of the respective tone images 2101, 2103, and 2105. That is to say, with regard to the tone image 2101, the values obtained by dividing the light amounts at respective positions of the tone image 2101 in the main scanning direction by the average light amount of the tone image 2101 are used as the values along the vertical axis of FIG. 15A. The same goes for the tone images 2103 and 2105. As a result of standardization, the light amounts of the tone images 2101, 2103, and 2105 have similar values at most of the positions in the main scanning direction.

However, if the spots made by the light emitting elements 602 locally change due to manufacturing variations of the exposure head 106, the light amounts of the tone images 2101, 2103, and 2105 start to vary. Specifically, in the case of the tone image 2105, which represents a low tone, a sufficient light emission intensity is not obtained and the density decreases if the spots are locally increased. That is to say, when converted into the light amounts, the light amounts decrease as indicated by reference sign 2307 of FIG. 15A. On the other hand, in the case of the tone image 2101, which represents a high tone, decreasing a gap between neighboring pixels causes an increase in the density. That is to say, when converted into the light amounts, the light amounts increase as indicated by reference sign 2306 of FIG. 15A. Note that reference sign 2308 of FIG. 15A denotes the light amount of the tone image 2103, which represents an intermediate tone.

Figure 15B:
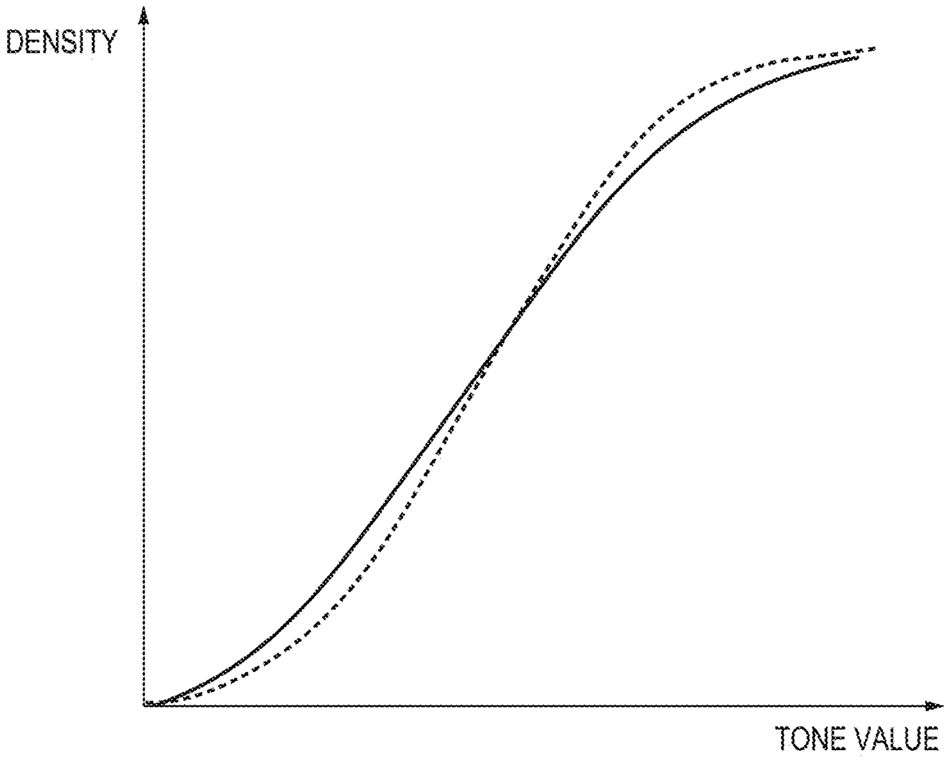

In FIG. 15B, a solid line denotes the density characteristic for a case where the spots do not fluctuate, whereas a dotted line denotes the density characteristic for a case where the spots have become larger than a standard. As shown in FIG. 15B, when the spots have become larger than the standard, the density increases in a high-tone region, and the density decreases in a low-tone region. Note that the influence in an intermediate-tone region is small.

The CPU 811 obtains a peak value difference, which is a difference between a peak value of the normalized light amounts of the tone image 2101 (reference sign 2306 of FIG. 15A) and a peak value of the normalized light amounts of the tone image 2105 (reference sign 2307 of FIG. 15A). Determination information indicating a relationship between peak value differences and the spot displacement amounts that have been obtained experimentally is stored in the image forming apparatus in advance. By using the determination information based on the obtained peak value difference, the CPU 811 obtains the spot correction values C associated with the light emitting elements 602 corresponding to the positions in the main scanning direction at which the normalized light amounts have fluctuated.

Note that the specific values that have been used in the description of the present embodiment are examples, and the present invention is not limited to using these specific values.

As described above, in the present embodiment, the fluctuations in the light amounts of the respective light emitting elements 602 in the main scanning direction are corrected in two steps. First, the image controller 800 corrects the light amount difference between light emitting chips 400 using the digital values to be set in the D/As 901 inside the light emitting chips 400. Then, the image controller 800 corrects the fluctuations in the light amounts of the respective light emitting elements 602 inside the light emitting chips 400 by correcting image data. By correcting the light amount difference between light emitting chips 400 using the digital values to be set in the D/As 901 inside the light emitting chips 400, the amount of correction of the image data can be reduced, and deterioration in the image quality caused by the correction of the image data can be suppressed. Also, by correcting the light amount difference between light emitting elements 602 inside the light emitting chips 400 by way of correction of the image data, simple and high-precision correction can be performed compared to a configuration provided with a correction circuit for correcting the currents flowing through the light emitting elements 602 on an individual basis. That is to say, with the configuration of the present embodiment, density unevenness can be suppressed without increasing the circuit scale compared to a case where a correction circuit for correcting the currents flowing through the respective light emitting elements 602 inside the light emitting chips 400 is provided in the chips.

Furthermore, correction of the image data is performed, in units of partial images, by changing exposure dots and non-exposure dots using the threshold matrices having the same size as these partial images. The same threshold matrices are used repeatedly with respect to each of the partial images that compose an image. However, as the light amount correction values to be compared with the threshold matrices correspond to the entirety of the image and are irrelevant to the size of the threshold matrices, the occurrence of image defects on the borders of the partial images can be suppressed. In addition, as exposure dots/non-exposure dots are changed in units of multiple dots that compose one pixel, light amount correction can be performed with high precision.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-048421, filed Mar. 24, 2022, which is hereby incorporated by reference herein in its entirety.

What is claimed is:

1. An image forming apparatus, comprising:
a photosensitive member that is driven to rotate;
an exposure head including a plurality of light emitting chips that are placed at different positions in a direction along a rotation axis of the photosensitive member, each of the plurality of light emitting chips including a plurality of light emitting elements that are placed at different positions in the direction along the rotation axis of the photosensitive member, a digital-analog converter that outputs a voltage corresponding to a setting value as a digital value, and a circuit unit that supplies a current to the plurality of light emitting elements based on the voltage output from the digital-analog converter; and
at least one processor,
wherein
the at least one processor is configured to:
generate second image data corresponding to each of the plurality of light emitting elements based on first image data, the second image data indicating whether to cause each of the plurality of light emitting elements to emit light, and based on correction information, change the first image data indicating that a part of the plurality of light emitting elements are to emit light to the second image data indicating that the part of the plurality of light emitting elements are not to emit light, and the circuit unit supplies a current to each of the plurality of light emitting elements based on the second image data.

2. The image forming apparatus according to claim 1, wherein with respect to each of a plurality of dots that compose an image, the first image data indicates whether a dot included in the plurality of dots is an exposure dot that is to be exposed to light by causing a light emitting element to emit light, or a non-exposure dot that is not to be exposed to light by not causing a light emitting element to emit light, and the at least one processor is configured to:

with respect to each of a plurality of partial images obtained by dividing the image, select a first change dot from among a plurality of first dots, which are a part of the plurality of dots and included in the partial image, based on the correction information; and in a case in which the first change dot is the exposure dot, generate the second image data by changing the first change dot to the non-exposure dot.

3. The image forming apparatus according to claim 2, wherein the correction information includes first correction information for determining first light amount correction values for the plurality of light emitting elements, respectively, and the at least one processor is configured to select the first change dot based on the respective first light amount correction values of a plurality of first light emitting elements that expose the plurality of first dots included in the partial image to light among the plurality of light emitting elements.

4. The image forming apparatus according to claim 3, wherein the respective first light amount correction values of the plurality of light emitting elements do not indicate that respective light amounts of the plurality of light emitting elements are to be increased.

5. The image forming apparatus according to claim 3, wherein the at least one processor has a threshold matrix indicating a plurality of thresholds that respectively correspond to the plurality of first dots included in the partial image, and is configured to select the first change dot by comparing a threshold of a first dot indicated by the threshold matrix with the first light amount correction value of a first light emitting element that exposes the first dot to light.

6. The image forming apparatus according to claim 5, wherein the threshold matrix is set so that an interval of the first change dot that is selected based on the first light amount correction values is uneven.

7. The image forming apparatus according to claim 2, wherein the at least one processor is configured to:

with respect to each of the plurality of partial images, select a second change dot from among the plurality of first dots included in the partial image based on the correction information; and in a case in which the second change dot is the non-exposure dot, generate the second image data by changing the second change dot to the exposure dot.

8. The image forming apparatus according to claim 7, wherein the correction information includes first correction information for determining first light amount correction values for the plurality of light emitting elements, respectively, and second correction information for determining second light amount correction values for the plurality of light emitting elements, respectively, the at least one processor is configured to:

select the first change dot based on the respective first light amount correction values of a plurality of first light emitting elements that expose the plurality of first dots included in the partial image to light among the plurality of light emitting elements; and select the second change dot based on the respective second light amount correction values of the plurality of first light emitting elements, and each of the first light amount correction values and each of the second light amount correction values is a value based on a tone value of a pixel that includes a dot associated with the light emitting element.

9. The image forming apparatus according to claim 8, wherein the respective first light amount correction values of the plurality of light emitting elements do not indicate that respective light amounts of the plurality of light emitting elements are to be increased, and the respective second light amount correction values of the plurality of light emitting elements do not indicate that respective light amounts of the plurality of light emitting elements are to be reduced.

10. The image forming apparatus according to claim 9, wherein each of the first light amount correction values of a light emitting element is a sum of a predetermined first correction value of the light emitting element and a second correction value based on a tone value of a pixel that includes a dot associated with the light emitting element, and each of the second light amount correction values of a light emitting element is a third correction value based on a tone value of a pixel that includes a dot associated with the light emitting element.

11. The image forming apparatus according to claim 10, wherein the second correction value of a light emitting element is 0 in a case in which the tone value of a pixel that includes a dot associated with the light emitting element is less than a first threshold, the third correction value of a light emitting element is 0 in a case in which the tone value of a pixel that includes a dot associated with the light emitting element is greater than a second threshold, and the first threshold is greater than the second threshold.

12. The image forming apparatus according to claim 10, wherein the second correction value is 0 for a light emitting element which is included among the plurality of light emitting elements and which is different from a predetermined second light emitting element, and the third correction value is 0 for a light emitting element which is included among the plurality of light emitting elements and which is different from the second light emitting element.

13. The image forming apparatus according to claim 12, wherein the second light emitting element is a light emitting element which is included among the plurality of light emitting elements and for which a size of a spot formed on the photosensitive member by light emission is larger than a reference value.

14. The image forming apparatus according to claim 2, wherein the first image data is data obtained by executing halftone processing with respect to third image data indicating tone values of pixels, and a size of pixels indicated by the third image data is larger than a size of the plurality of dots.

* * * * *